Feb. 25, 1947. R. E. STOLTZ 2,416,416
METHOD OF AND APPARATUS FOR WINDING TUBES
Filed April 5, 1943 3 Sheets-Sheet 1
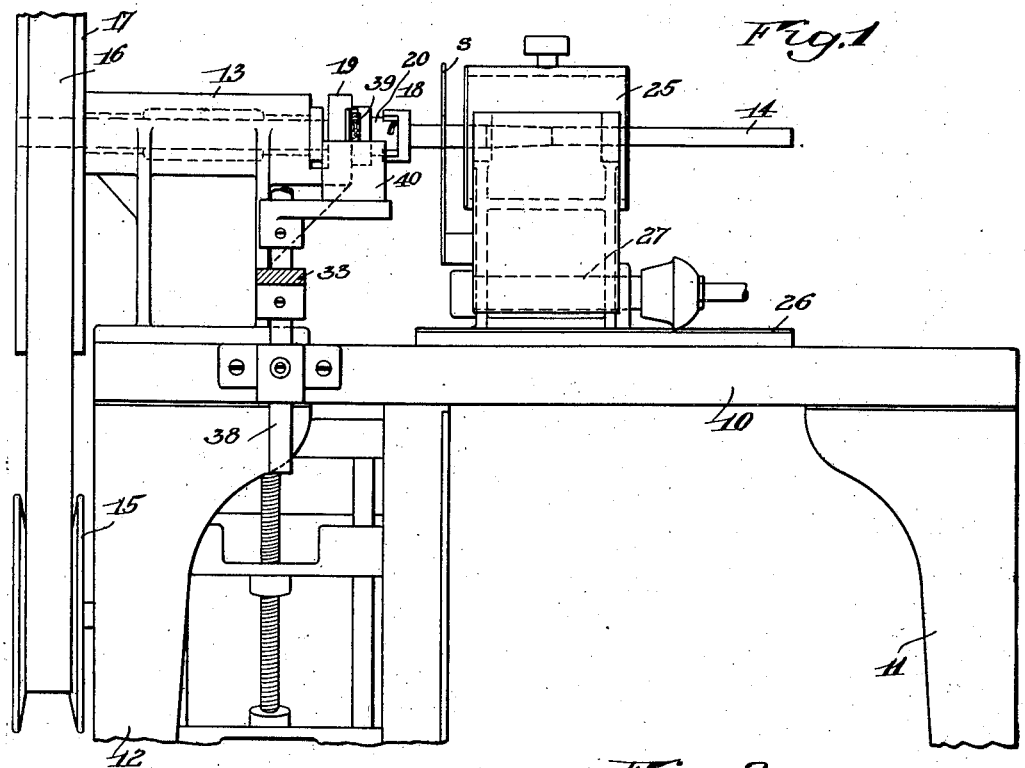
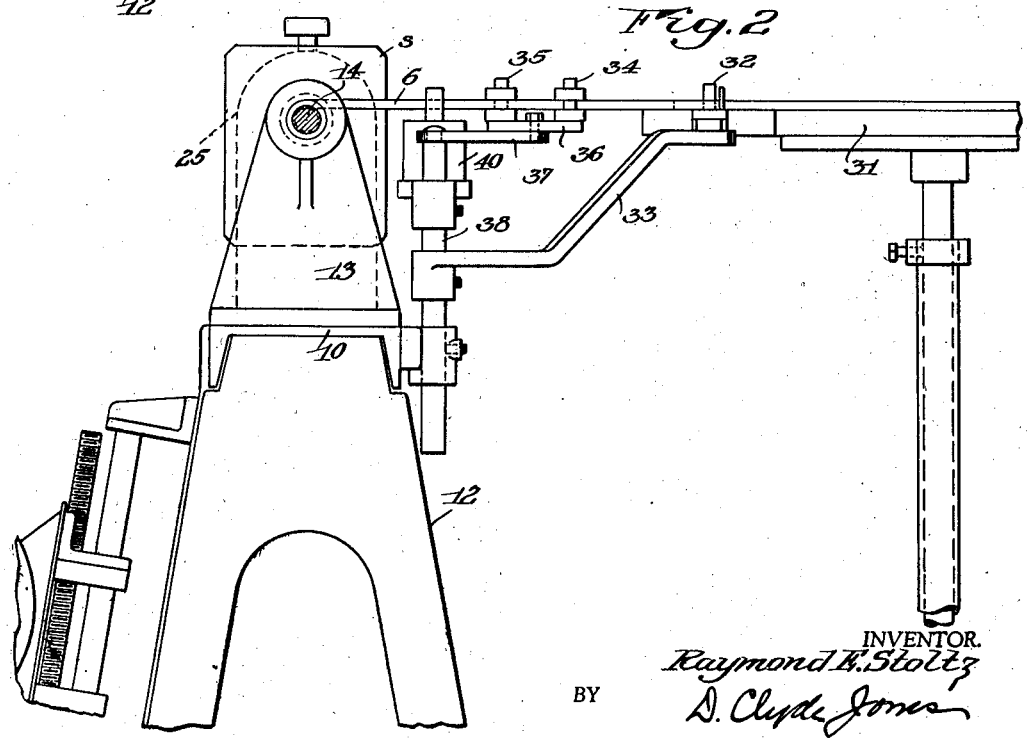
INVENTOR.
Raymond E. Stoltz
BY D. Clyde Jones
his Attorney

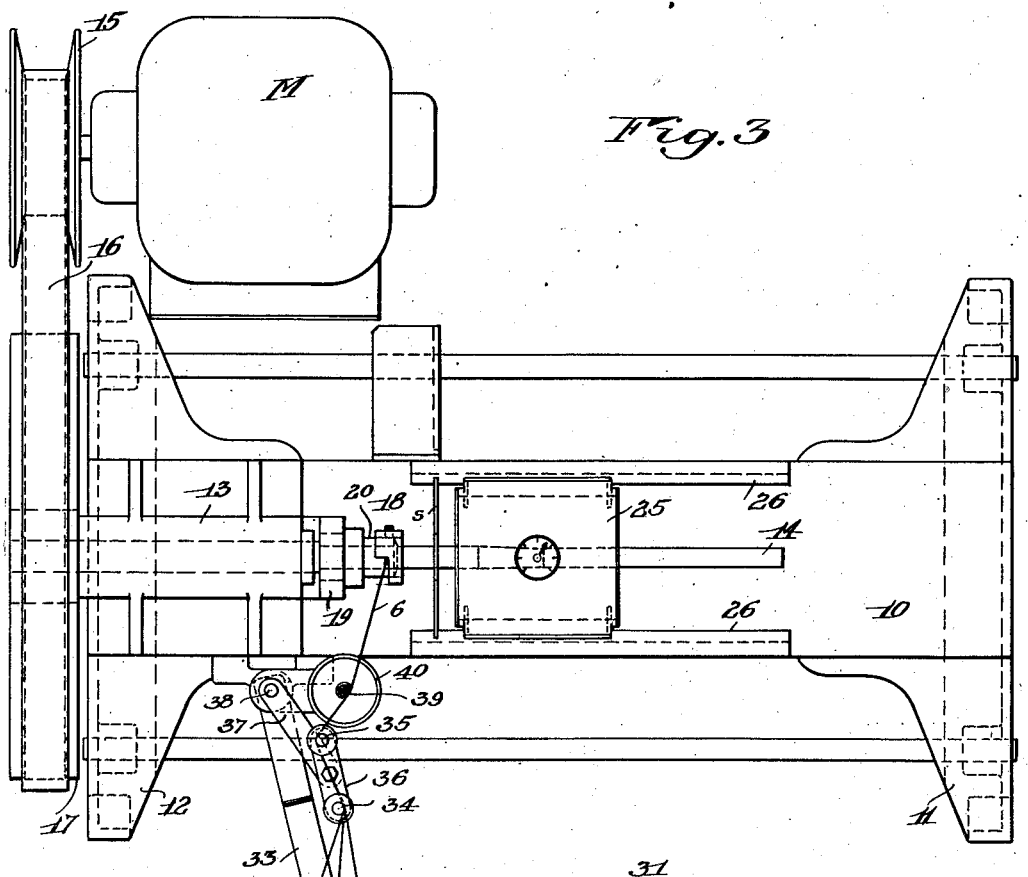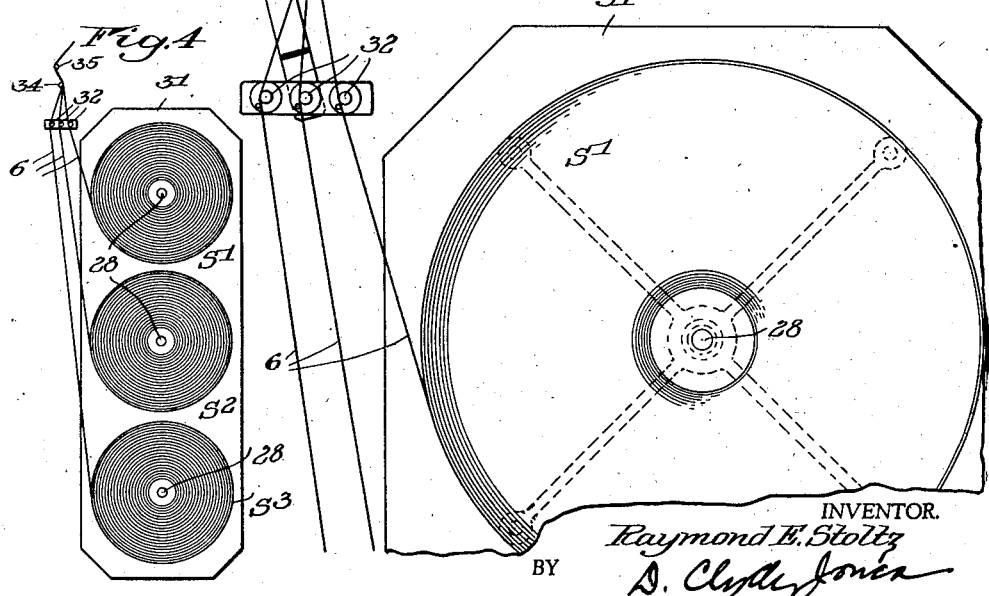

Feb. 25, 1947.　　　R. E. STOLTZ　　　2,416,416
METHOD OF AND APPARATUS FOR WINDING TUBES
Filed April 5, 1943　　　3 Sheets-Sheet 3
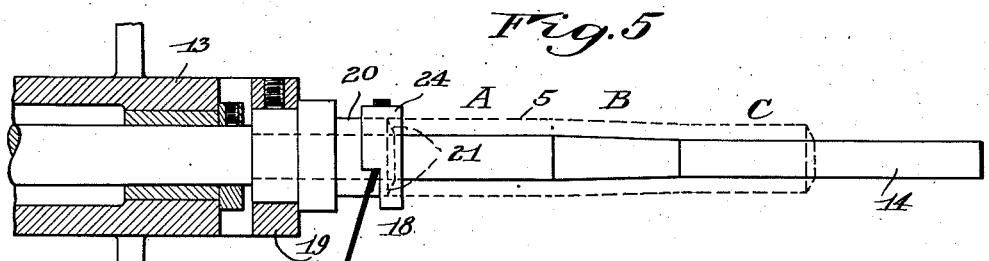
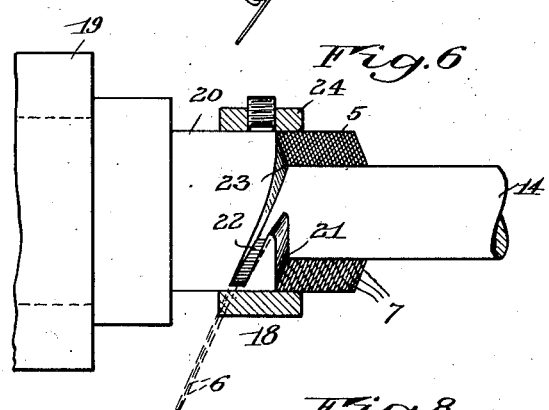
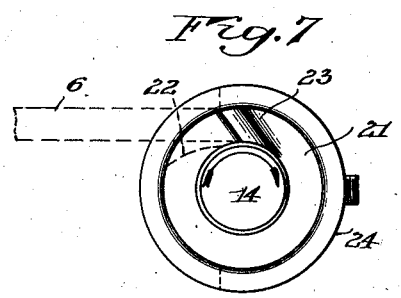
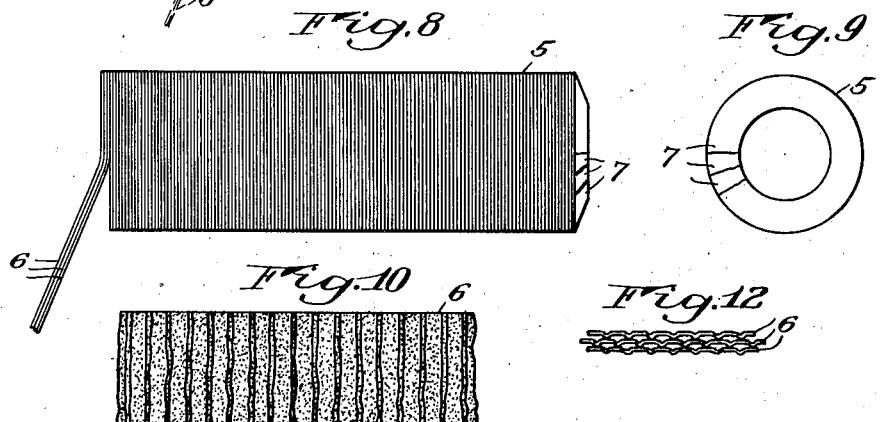
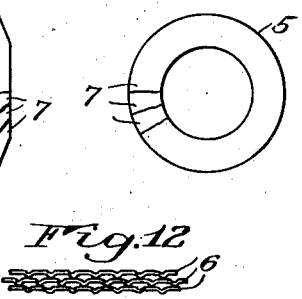
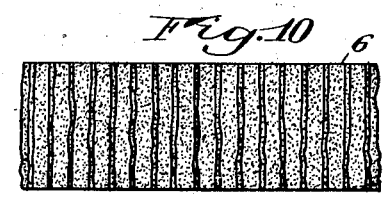
INVENTOR.
Raymond E. Stoltz
BY D. Clyde Jones
his Attorney Patented Feb. 25, 1947

2,416,416

UNITED STATES PATENT OFFICE 2,416,416

METHOD OF AND APPARATUS FOR WINDING TUBES

Raymond E. Stoltz, St. Albans, N. Y., assignor to M. D. Knowlton Company, Rochester, N. Y., a corporation of New York Application April 5, 1943, Serial No. 481,947

13 Claims. (Cl. 93—1)

1

This invention relates to a method of and to apparatus for winding laminated tubes such as filter cores, from strip material.

In certain types of filtering devices, it is customary to cause the fluid to be filtered, to pass through a hollow cylindrical filtering element or core made of laminated fibrous material. In the past, such core elements have been made by punching out rings or washers from resinous-coated crepe paper, after which they were stacked to form a laminated hollow cylinder, and then baked to make them cohere as a result of the fusion of the coating. The stamping of the rings from the crepe paper resulted in a considerable waste of material and the assembling of the rings into a stack of cylindrical form proved to be a rather expensive operation.

The main features of the present invention relate to a method of and to means for winding one or more strips of material into a hollow cylindrical tube or core wherein the strips are superimposed in layers inclined to or normal to the principal axis of the core, and fastening the layers together.

Other features and advantages of the invention will appear from the detailed description and the claims when taken with the drawings in which:

Fig. 1 is a front elevation partially broken away, of a machine for winding the filter core elements in accordance with the present invention;

Fig. 2 is a fragmentary end view and Fig. 3 is a fragmentary plan view of the essential portions of this machine;

Fig. 4 is a plan view (on a reduced scale) of a table showing the arrangement for supporting three spools or coils of crepe paper strips;

Fig. 5 is a view partially in section of a forming chuck and a related mandrel showing a crepe paper strip entering the forming chuck and also indicating in dotted lines a wound filter core section in position on the mandrel;

Fig. 6 is a sectional view and Fig. 7 is an end view showing particularly the forming surface of the chuck and its relation to the mandrel;

Fig. 8 is a side view and Fig. 9 an end view of a filter core element wound on a machine of the present invention;

Fig. 10 is a face view and Fig. 11 is an edge view, both greatly enlarged, of the crimped, resinous-coated, fiber strip from which a core element is wound; and Fig. 12 is a view, also enlarged, of two layers of the crimped strip in superimposed relation indicating the offset relation of the crimps in the con-

2 tacting surfaces of adjacent layers whereby the resulting core element is sufficiently porous, to provide good filtering action.

The method of the present invention provides an efficient way for spirally winding a filter core element 5 (Figs. 8 and 9), from one or more ribbons or strips 6, of crimped paper or like fibrous material having its surfaces coated with a resinous or other thermo-plastic material. However, the crimping of the paper causes it to have corrugated surfaces and since the corrugations of adjacent turns are not in registry (Fig. 12), the finished filter core will have a high degree of porosity even after it is baked, in the course of its manufacture, to cause adjacent turns thereof to be fused together. Although the core element has been illustrated herein as being wound from three strips, it will be understood that the invention is not so limited since the greater number of strips are used merely to increase the output of the machine. The strips 6 (Fig. 8) are spirally wound into dished layers 7 which are nested with their surfaces inclined toward the principle axis of the finished core element, preferably at an angle somewhere in the neighborhood of 70°, although this angle might be as great as 90°, in which case, the successive turns or layers of the strips would extend at right angles to the main axis of the core. It will be understood that the particular angle chosen depends somewhat upon the degree of elasticity of the crimped strip material from which the core is wound and also depends upon the empirically determined angle necessary to meet the filtering requirements of a given core element.

The machine for winding the filter core element, just referred to, comprises the bed plate 10 mounted on suitable supports, such as legs 11 and 12. The bed plate has secured thereon a headstock 13 which provides bearings for a rotatable winding mandrel 14. This mandrel is generally cylindrical in form being provided with a portion A of relatively large diameter connected by a tapering portion B to a cylindrical portion C of reduced diameter (Fig. 5). This mandrel is suitably held against longitudinal movement and is driven from the motor M through an adjustable speed drive such as a variable speed pulley 15, the belt 16 and pulley 17, the latter being secured to the outer left end of the mandrel (Figs. 1 and 3). The mandrel extends through a forming chuck 18 which is fixedly mounted in a projection or lug 19, comprising a part of the headstock.

The forming chuck, as best shown in Figs. 6 and 7, includes a sleeve 20 through which the mandrel extends and rotates freely although the fit between these parts is such as to obviate any danger of the strips of fibrous material becoming lodged in the space therebetween. The sleeve has a beveled or frustro-conical right end surface 21 (Fig. 6) and has its outer lateral surface provided with a kerf 22 extending diagonally with respect to the main axis of the sleeve, from an intermediate point on said surface to the mentioned beveled end. This kerf, functioning to guide the strip or strips 6, gradually increases in depth until it merges at 23 with the beveled or frustro-conical end surface 21 of the sleeve against which the strip layers 7 build up to form a desired core element 5. A collar 24 is secured in snug engagement with the outer surface of the sleeve so that it extends beyond the mentioned beveled end of the sleeve to provide a guide for the outer edge of the strip or strips 6 being wound on the mandrel.

As indicated in Figs. 1, 2 and 3, the mandrel extends through the open ended oven 25, which is mounted on horizontal ways 26 for adjustment along the mandrel and which is heated in any suitable manner, such as by a gas burner 27. It will be noted that, during the winding operation, this oven encloses the tapered part B of the mandrel and also some of that portion C of the mandrel having a reduced diameter, so that the filter core when it shrinks during the baking operation will not "freeze" on the mandrel. A shield s keeps the heat from the forming chuck.

As shown in the plan view of Figs. 3 and 4, the crimped strips 6 of resinous-treated fibrous material, are fed from the spools S1, S2 and S3. These spools are held on individual pins 28, projecting from the upper surface of the horizontal table 31 which is supported adjacent the front of the bed plate at the approximate level of the forming chuck. The strips, as they are unwound from the several spools, pass about the guides 32, mounted on a bracket 33 (Fig. 2) so that these guides project in the paths of the strips 6, as they issue from the respective spools S1, S2 and S3. This bracket is adjustably secured to an intermediate portion of a post 38 which is mounted for vertical and angular adjustment on a part connected to the bed plate 10. From these guides, the strips pass through a suitable tensioning arrangement which includes two spaced vertical pins 34 and 35, having annular grooves about their peripheries (Fig. 2), the grooves being preferably of a width to freely receive the strips flatwise therein. These pins are mounted on the ends of an arm 36 which in turn is pivotally mounted on a bracket 37. This bracket is secured to the upper end of the previously mentioned post 38 which provides a convenient vertical and angular adjustment for the parts serving to guide the strips 6 into the forming chuck. It will be noted that the strips 6 are threaded through the tensioning arrangement to engage the right-hand surface of the pin 34 (Fig. 3) and to engage the left-hand surface of the pin 35, and thence over the surface of a lubricating wick 39, saturated with mineral oil or other lubricating oil supplied from the reservoir 40. It will be understood that the wick 39 lubricates the surface of that one of the three strips 6 which will contact the beveled surface 21 of the forming chuck, thereby tending to reduce the friction between the strips and that surface of the chuck.

In the operation of this machine, the three crimped strips 6 of resinous-coated paper from the respective spools S1, S2 and S3 are positioned to engage their respective guides 32, and then come together at the tensioning pins 34 and 35 from which they proceed past the lubricating wick 39 where the outer left-hand surface of the outermost strip is lubricated. Thereupon, the strips move together along the guide surfaces of the kerf 22 in the sleeve of the forming chuck and follow the contour of the left-hand surface of this kerf (Fig. 6) which merges at 23 with the beveled or frustro-conical surface 21 of the forming chuck. As the mandrel rotates, the strips stack themselves in spiral layers 7 in cylindrical form against the beveled end 21 of the chuck with their inner edges snugly fitting the mandrel and with their outer edges engaging the inner surface of the collar 24. The dimensions of the forming chuck 18 and the mandrel 14 are such that the inner edges of the spirally wound strips engage the surface of the mandrel with just enough friction that the strip layers 7 (Fig. 6) snugly press against each other and yet, as they build up to form the core element, they are forced along the mandrel into the oven 25. The forcing of the layers along the mandrel, arises from the fact that each turn or layer of the strip, in being generated, is interposed between the fixed surface 21 and the turn last generated. Since the surface 21 is fixed, the turns must move away therefrom along the mandrel. It will be noted that the portion B of the mandrel where it starts to enter the oven is tapered to a smaller diameter. This change in the diameter of the mandrel permits the filter core, when it shrinks in the course of baking, to continue to move along the mandrel without freezing thereof. Although the core element can be wound to relatively great length, the right-hand portion of the machine may be provided with a saw (not shown) which can be intermittently operated in any suitable manner to cut the core element into convenient lengths as it leaves the mandrel.

In the initial threading of the strips 6 into the machine, one strip is inserted through the kerf 22 in the forming chuck where the free end of the strip con be tied in a knot around the mandrel 14. As the mandrel rotates, it will draw the strip into the forming chuck and when a plurality of strips are used, a second strip is then threaded along the first strip through the kerf in the forming chuck without stopping the machine. The friction between the two strips will be sufficient to start the second strip winding. In the case where a third strip is used, it will be fed into the machine in like manner as the second strip.

It should be pointed out that in order to obtain the proper pressure between the several turns of ribbon comprising the core element until the core is baked, the mandrel must have the proper shape and proportion. It has been mentioned that the mandrel 14 has a straight or cylindrical section A whereon the winding is done, followed by the tapered portion B merging into the cylindrical portion C so that the core element can contract as it is baked, without seizing the mandrel which would result in stalling of the machine. It therefore becomes very important that the reduction in the mandrel diameter shall be in correct ratio to the contraction of the core. This requirement arises from the fact that the mandrel must offer just sufficient resistance to movement of the core turns or layers 7 lengthwise thereof, to obtain the necessary pressure to cause these turns to contact each other snugly.

While the invention is particularly applicable to the winding of filter core elements, it is not limited to this use but can be utilized generally for the winding of certain types of laminated tubes.

What I claim is:

1. In a machine for making laminated tubes or the like from strip material, a cylindrical mandrel mounted for rotation, and a stationary forming unit having an uninterrupted cup-like peripheral rim secured thereto and an annular surface concentric with said mandrel, said surface extending from said rim approximately to the surface of said mandrel, said forming unit comprising means provided with a guide slot communicating with said surface for guiding a strip to said forming unit.

2. In a machine for making laminated tubes or the like from strip material, a cylindrical mandrel mounted for rotation, and a stationary forming unit having an uninterrupted cup-like peripheral rim secured thereto and an annular surface concentric with said mandrel, said surface extending from said rim approximately to the surface of said mandrel, said forming unit comprising means provided with a guiding slot intersecting said annular surface, said slot having a surface merging with said annular surface for guiding a strip to said forming unit.

3. In a machine for making laminated tubes or the like from strip material, a cylindrical mandrel mounted for rotation, a fixed sleeve fitting on said mandrel, said sleeve having an annular surface, concentric with and extending to said mandrel, a continuous peripheral rim provided on said sleeve bounding said surface and projecting beyond the same, said sleeve having a slot therein extending diagonally with respect to the axis of said mandrel, said slot having one side surface extending under said rim and merging with said annular surface.

4. In a machine for making laminated tubes or the like from strip material, a mandrel comprising a first cylindrical portion merging with a second axially alined cylindrical portion through a tapered portion, a forming member having an annular surface encircling the first cylindrical portion of said mandrel and extending approximately to the surface thereof, said annular surface being directed toward the axis of said mandrel, means for effecting relative rotation between said mandrel and said member, means for guiding a strip over said surface in a spiral path encircling said mandrel, and heating means encircling a part of said mandrel in the region of said tapered portion thereof.

5. In a machine for making laminated tubes or the like from strip material, a rotatable mandrel comprising a first cylindrical portion merging with a second axially alined cylindrical portion through a tapered portion, a forming member having an annular surface encircling said first cylindrical portion of said mandrel and extending approximately to the surface thereof, said surface being directed toward the axis of said mandrel, means for guiding a strip over said surface in a spiral path encircling said mandrel, and heating means encircling a part of said mandrel in the region of said tapered portion.

6. The method of winding a laminated filter tube from fibrous strip material which comprises securing one end of the strip to a rotatable mandrel located in a fixed position, rotating said mandrel to wind said strip against a fixed barrier into spiral turns on the mandrel, guiding said strip at an invariable position as it is being wound to direct the respective turns edgewise toward the principal axis of said mandrel, and securing adjacent turns together.

7. The method of winding a laminated filter tube from fibrous strip material which comprises securing one end of the strip to a rotatable mandrel located in a fixed position, rotating said mandrel to wind said strip against a fixed barrier into spiral turns on the mandrel, guiding said strip at an invariable position as it is being wound to direct the respective turns edgewise toward the principal axis of said mandrel, securing adjacent turns together, and subjecting said turns to heat in order to melt said coating whereby said turns are fused together.

8. The method of making a hollow cylindrical core element from a thermoplastically coated, crimped strip of fibrous material which comprises winding the strip in the form of a succession of spiral turns on a cylindrical support located in a fixed position, with each new turn engaging a fixed barrier and with the turns in snug edgewise contact with the support whereby each new turn as it is wound and also previous turns of the core are forced along the support to bring adjacent surfaces of the turns into contact, and securing the turns in this contacting relation.

9. The method of making a hollow cylindrical core element from a thermoplastically coated, crimped strip of fibrous material which comprises winding the strip in the form of a succession of spiral turns on a cylindrical support located in a fixed position, with each new turn engaging a fixed barrier and with the turns in snug edgewise contact with the support whereby each new turn as it is wound and also previous turns of the core are forced along the support to bring adjacent surfaces of the turns into contact, securing the turns in this contacting relation, and baking the turns while thus in contact to cause said coating to join said adjacent turns together.

10. The method of making a hollow cylindrical core element from a thermoplastically coated, crimped strip of fibrous material which comprises wrapping the strip in the form of a succession of spiral turns at a certain point on a cylindrical support located in a fixed position while drawing the turns into snug edgewise contact with the support, forcing each turn as wound progressively along the support to bring adjacent surfaces of the turns into contact, and baking said turns on a support of smaller diameter than that of the first support, to cause said coating to fuse said turns together.

11. The method of making a hollow filter core element, which comprises spirally winding a thermoplastically coated strip of crimped fibrous material by continuously drawing said strip in a spiral path around a guide fixed in location and with one surface of said strip against a frustroconical surface invariable as to location to generate from said strip superimposed spiral layers, supporting said layers edgewise on the guide with sufficient friction between the guide and an edge of said layers whereby a surface of each layer as it is being generated is forced into contact with a surface of a preceding layer, and subjecting the contacting layers to heat whereby these layers are adhesively joined together.

12. In a machine for making laminated tubes or the like from strip material, a mandrel member fixed against translatory movement, a forming member fixed against translatory movement, said forming member having an annular surface encircling said mandrel and extending approximately to the surface thereof, said annular surface being directed toward the axis of said mandrel, said forming member being provided with a cup-like rim secured thereto enclosing said surface and extending in the same direction as said mandrel, means for effecting rotation of one of said members, means for maintaining the other member stationary, and means for guiding a strip over said surface in a spiral path encircling said mandrel.

13. In a machine for making laminated tubes or the like from strip material, a rotatable mandrel fixed against translatory movement, a stationary forming member having an annular surface encircling said mandrel and extending approximately to the surface thereof, said surface being directed toward the axis of said mandrel, said member being provided with a rim secured thereto having an uninterrupted internal face enclosing said surface and extending therebeyond in the same direction as said mandrel, and means for guiding a strip over said surface in a spiral path encircling said mandrel.

RAYMOND E. STOLTZ.

REFERENCES CITED

The following references are of record in the file of this patent:

UNITED STATES PATENTS

| Number | Name | Date |
|---|---|---|
| 860,720 | Adams | July 23, 1907 |
| 861,608 | Richardson | July 30, 1907 |
| 1,697,158 | Bastain | Jan. 1, 1929 |
| 1,949,610 | Marsh | Mar. 6, 1934 |
| 2,250,430 | Wade | July 22, 1941 |
| 84,208 | Moulton | Nov. 17, 1868 |
| 867,390 | Lovejoy | Oct. 1, 1907 |
| 1,920,154 | Carlson | July 25, 1933 |